May 8, 1956 W. H. JACOBS 2,744,660
BEVERAGE DISPENSER
Filed July 18, 1952 5 Sheets-Sheet 1

Inventor:
William H. Jacobs,
by Thuson & Thuson
Attorneys

May 8, 1956  W. H. JACOBS  2,744,660
BEVERAGE DISPENSER

Filed July 18, 1952  5 Sheets-Sheet 3

Inventor:
William H. Jacobs,
by Thomson & Thomson
Attorneys

May 8, 1956  W. H. JACOBS  2,744,660
BEVERAGE DISPENSER
Filed July 18, 1952  5 Sheets-Sheet 4
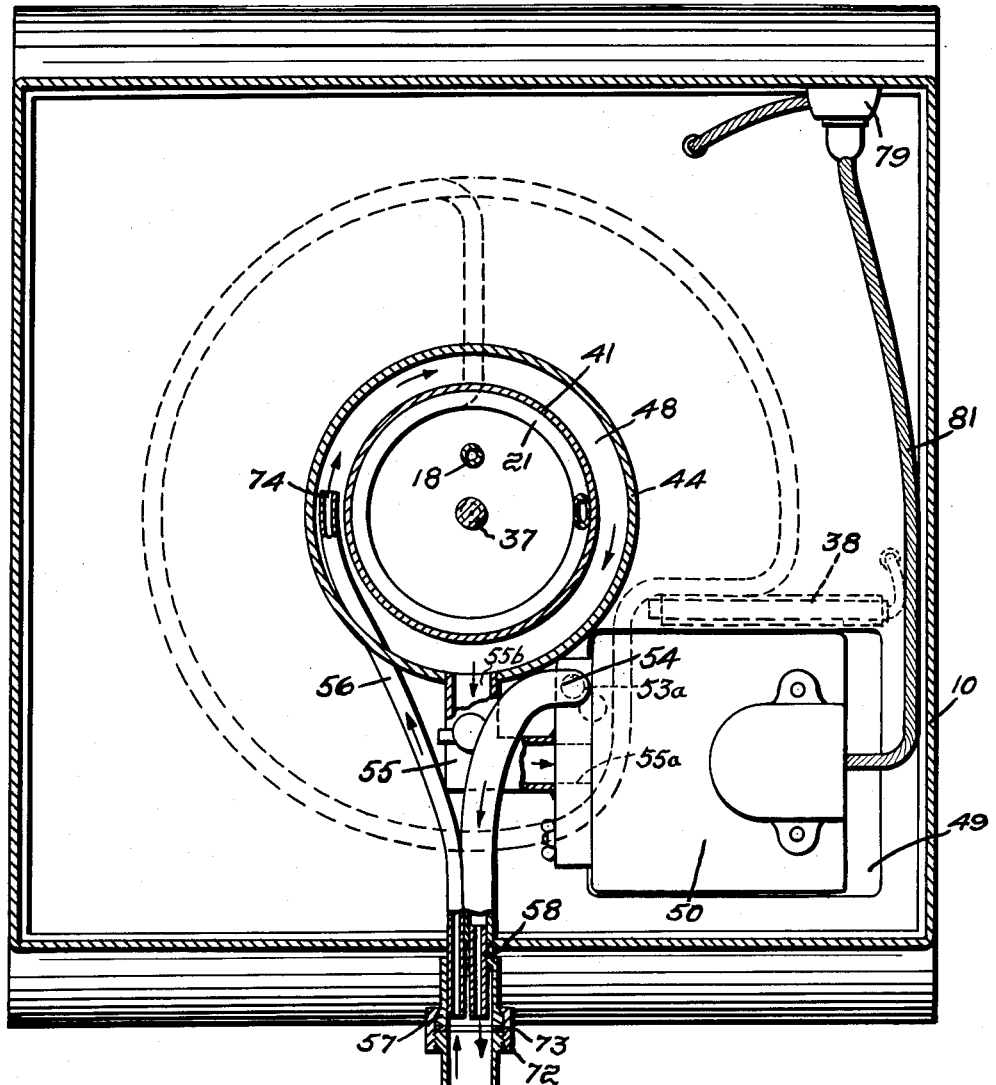
Fig. 5.
Fig. 6.
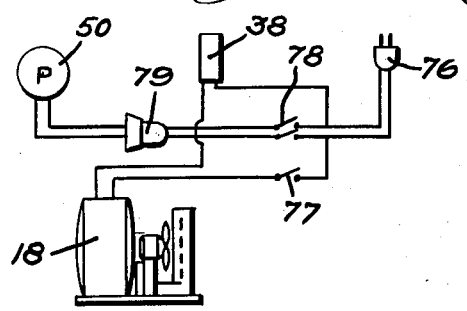
Inventor:
William H. Jacobs,
by Thomson & Thomson
Attorneys

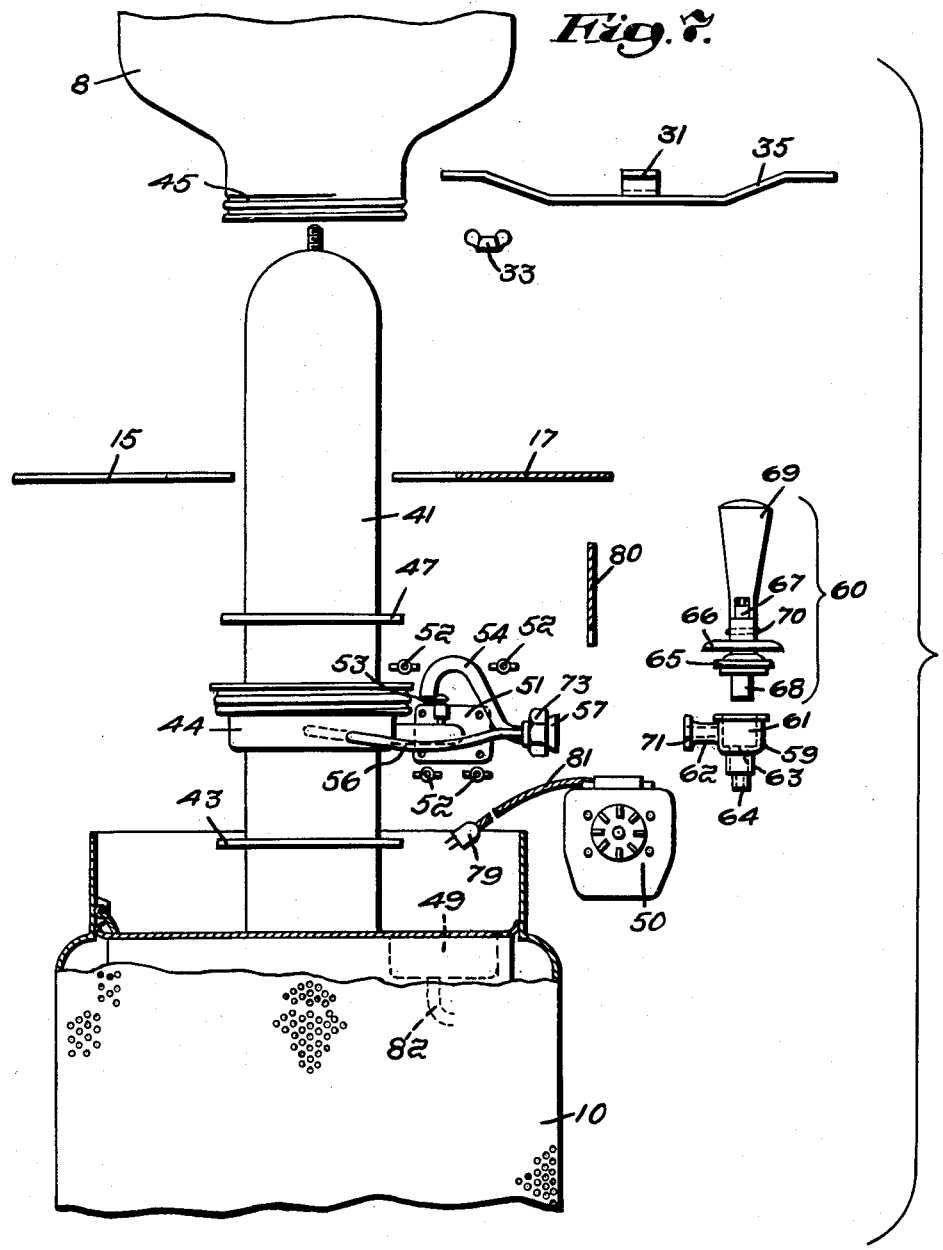

United States Patent Office 2,744,660
Patented May 8, 1956

2,744,660

BEVERAGE DISPENSER

William H. Jacobs, Newton, Mass.

Application July 18, 1952, Serial No. 299,562

8 Claims. (Cl. 222—146)

This invention relates to apparatus for displaying and dispensing fruit juices, milk, and similar beverages.

Dispensers of this general type are used in soda fountains and similar establishments and consist in general of a display stand supporting a visible storage tank, which is filled with the prepared beverage, and is provided with a valve for dispensing individual portions. Some beverages must be cooled in order to remain fresh and palatable, and in the case of fruit juices, such as orange juice, it is also desirable to maintain constant circulation of the beverage so as to keep the solid and liquid constituents thoroughly mixed. In most dispensers now in use, the dispensing valve is connected to the tank through a single pipeline. As the cooling and circulation, if any, take place only in the tank, the liquid contained in the pipelines is likely to become impalatable unless beverage is drawn off at frequent intervals.

The object of this invention is to provide a dispenser which is convenient for dispensing prepared beverages, makes an attractive display, can be readily dismantled for cleaning, and has provision for continuously cooling and circulating all the beverage contained in the apparatus, including that in the pipeline leading to the dispensing valve. The dispenser here disclosed also makes most efficient use of the refrigerating element and is adapted for visual display of the whirling action which circulates and agitates the beverage.

In the drawings:

Fig. 5 is an enlarged cross-section taken along line 5—5 of Fig. 3;

Fig. 6 is a schematic diagram of the electrical circuit for the cooling apparatus and circulating pump; and Fig. 7 is a detail showing the manner of dismantling some of the parts for cleaning.

Figure 1:
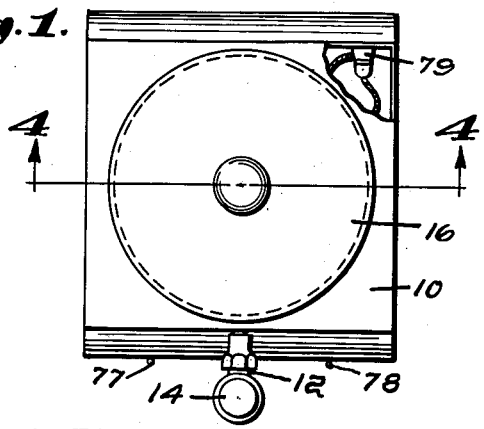
Fig. 1 is a plan view of a dispenser constructed according to the invention.
Figure 2:
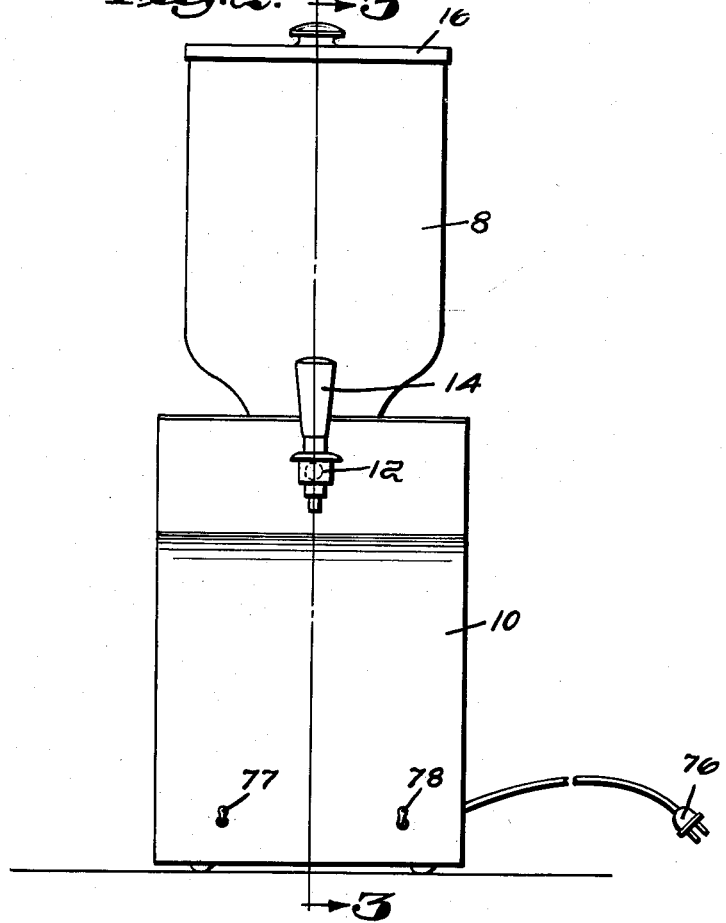
Fig. 2 is a front elevation of the dispenser of Fig. 1.

As shown in Figs. 1, 2, 3 and 4, the beverage is stored and displayed in a tank 8 preferably made of glass or other transparent material, mounted on a cabinet 10. A dispensing valve 12 controlled by a handle 14, is mounted on the side of the cabinet and connected by piping to the tank. The tank is closed at the top by a cover 16. The top wall of the cabinet consists of two removable sections 15 and 17. In the bottom of cabinet 10 is mounted a refrigerating compressor unit 18 of conventional construction. Above this unit is a box 24, which is supported by mounting straps 20 and 22, and is preferably double walled, and insulated by means of a packing 26. In the box is mounted a heat exchange coil 28 which encloses the gas return line 30 and the fluid return line 32 for the refrigerant as is customary. The theremostat 38 which regulates the refrigerating system is also mounted in box 26.

Above box 26 is a pan 40 which extends entirely across the cabinet and prevents beverage or cleaning solution from reaching the equipment housed in the lower part. On top of the pan is mounted a cylindrical casing 41, with a dome-shaped top, which houses a set of refrigerating coils 42. These coils are connected through lines 30, 32, and 34 to the compressor unit. Casing 41 is held in place by a central stud 37 which runs from the under side of box 24, where it is secured by a nut 39, up through a strap 35. The strap extends over the walls of tank 8, so as to hold the tank firmly in place when cover 16 is removed, and carries a Z-clip 31 for levelling the cover. A wing-nut 33 secures the top of stud 37 holding the entire casing assembly together.

Surrounding the bottom of casing 41 is a washer 43, of rubber or similar material, and an inverted cap 44. As shown more clearly in Fig. 7, tank 8 is reduced at the bottom to form a threaded neck 45, and the upper part of cap 44 is threaded to receive this neck. Below its threaded part, cap 44 is reduced in diameter to form an internal shoulder 46. A second rubber washer 47 is interposed between the cap and neck 45, and rests on shoulder 46 when the parts are assembled making the joint between the cap and the neck watertight. The joint between cap 44 and casing 41 is made water-tight by washer 43. The inside diameter of washer 47 is larger than the outside diameter of casing 41, so that the space 48 between the cap and casing 41 is in communication with tank 8, and receives liquid therefrom.

Figure 3:
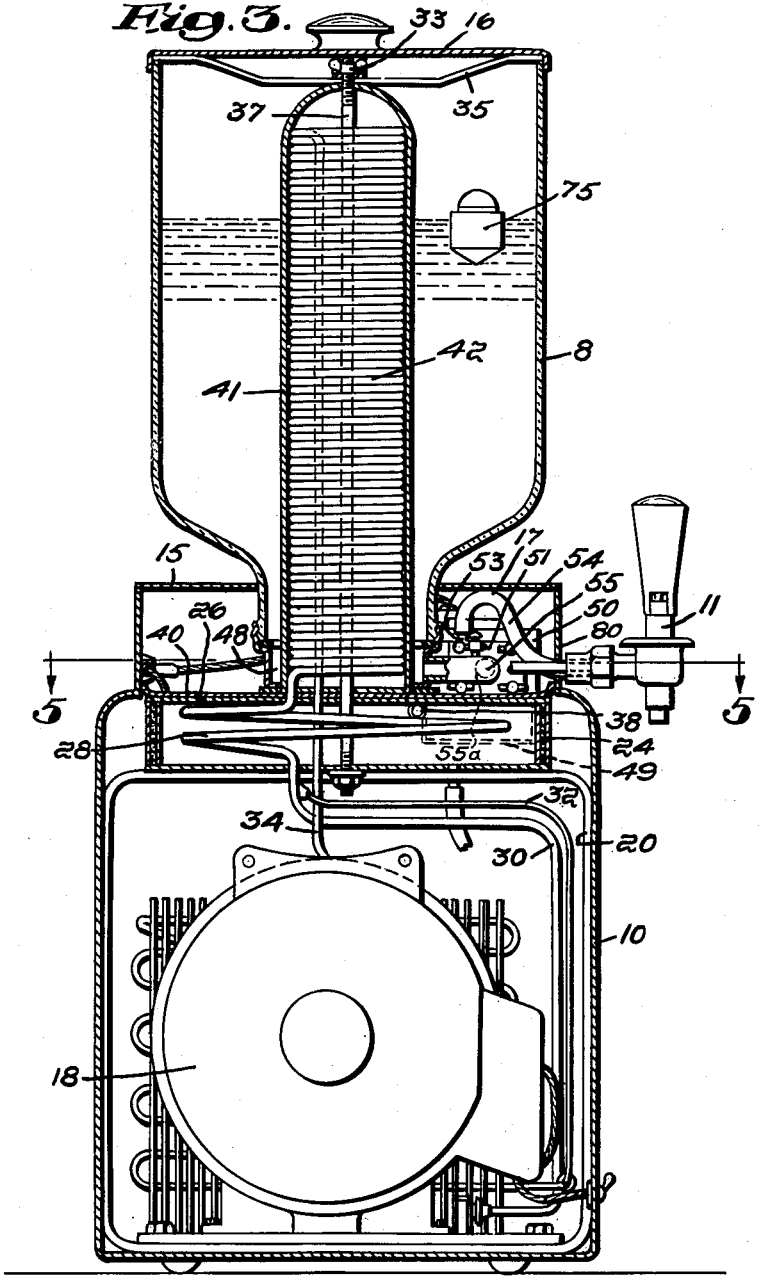
Fig. 3 is a cross-section, slightly enlarged, taken along line 3—3 of Fig. 2.
Figure 4:
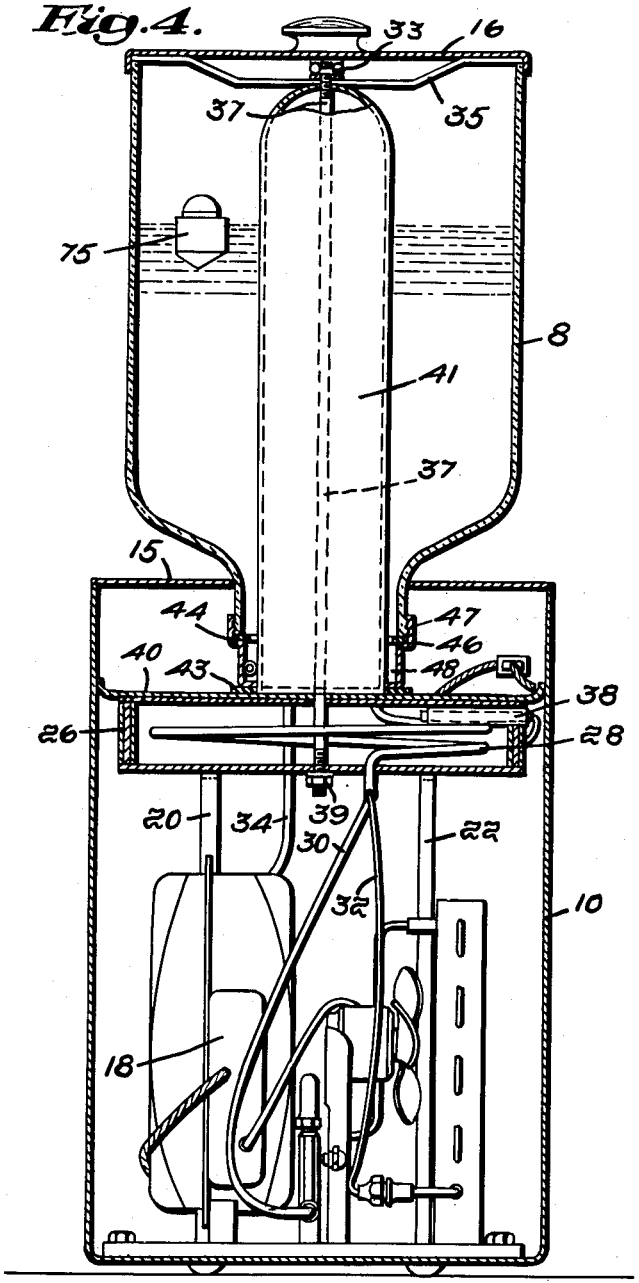
Fig. 4 is a cross-section, slightly enlarged, taken along line 4—4 of Fig. 1, some of the parts being shown in elevation.

As shown in Figs. 3 and 5, pan 40 is recessed in one corner to provide a rectangular well 49 in which is mounted a pump 50. The pump is electrically driven and may be of the type having a sealed motor, or of the type having a magnetically driven impeller with no shaft connection, so that the beverage does not come in contact with the electrical parts. A junction box 51 is mounted on one side of 50 and secured by four wing nuts 52. Mounted on the top of the junction box is a nipple 53 to which is attached a length of tubing 54. Nipple 53 communicates with the interior of the pump through an opening 53a which serves as the discharge port for the pump. Leading from the junction box is a pipe elbow 55, the other end of which is attached to cap 44 and communicates through orifice 44a with space 48. Elbow 55 communicates with the interior of the pump through an opening 55a which serves as the intake port for the pump. Also attached to cap 44 is a pipe 56, the inner end of which extends through the wall of the cap and is bent to follow its circumferential contour as shown in Fig. 5.

The outer end of pipe 56 is mounted in a plug 57. Also mounted in the plug is a nipple 58 to which one end of tube 54 is attached.

The dispensing valve 14 is a conventional type frequently used on beverage dispensers. As shown more clearly in Fig. 7, the valve consists in general of an elbow 59 and a plunger and handle assembly 60. The elbow has a central chamber 61, open at the top, in communication with an inlet pipe 62. In the bottom of chamber 61 is a dispensing orifice 63 which leads to a nozzle 64. When the valve is assembled, flange 65 fits over the top of chamber 61 and is secured by a snap ring 66. A shaft 67 runs up through flange 65 and carries a rubber plunger 68 which seats on the rim of orifice 63. A handle 69 is secured by pin 70 to shaft 67. Rotation of the handle to either side about the pin raises plunger 68 uncovering orifice 63. At the left hand end of inlet pipe 62 is a threaded mounting flange 71. As shown in Fig. 5, the valve is connected to plug 57 by means of a nut 72. A rubber washer 73 is interposed between the plug and pipe 62 to make the connection watertight.

When the dispenser is in use, the pump is in continuous operation. As indicated by the arrows in Fig. 5, beverage is drawn into the pump from space 48 and discharged through tube 54 into pipe 62. The beverage circulates in the space in chamber 61 around plunger 68 and flows out through pipe 56 into space 48. The discharge from the inner end 74 of pipe 56 is parallel to the wall of cap 44 and sets up a rotary motion in the beverage around the bottom of casing 41. This motion is transmitted to the beverage in the storage tank 8 so that the entire contents of the tank whirl around casing 41. For display purposes, a bob 75 (Fig. 3) may be floated on top of the beverage to indicate the whirling motion. The continuous circulation described above keeps the beverage in the valve chamber and piping, as well as that in the tank, uniformly cool, and thoroughly mixed so that the beverage drawn off is always palatable, even if the valve remains closed for a considerable period. The continuous motion of the fluid around casing 41 also improves the heat transmission through the surface of the casing and increases the refrigerating efficiency.

Fig. 6 shows the wiring arrangement for the compressor and pump motor circuits. A plug 76 may be connected to any convenient outlet and supplies power for both circuits. The compressor circuit is controlled by a switch 77 and the pump circuit by a single throw double-pole switch 78. In operation, when both switches are closed, pump 50 runs continuously, while the compressor unit 18 is under the control of thermostat 38.

The parts of the dispenser which come in contact with the beverage can be readily dismantled for cleaning as illustrated in Fig. 7. With cover 16 removed, nut 33 can be unscrewed and strap 35 taken off. Tank 8 can then be unscrewed from cap 44 and lifted out. Sections 15 and 17, and a small panel 80 over the valve, are detached from the cabinet. Wing nuts 52 are loosened so that pump 50 can be detached from junction box 51 and lifted out together with the length of cable 81 leading to plug 79. Plug 57 is disconnected from pipe 62 by loosening nut 73. The valve may be taken apart as shown and cap 44, with the junction box and connecting piping, and washers 43 and 47, are slid off over casing 41. The parts which are removed can then be cleaned and sterilized, and the casing washed. A drain pipe 82 leading from the bottom of well 49 may be connected to the length of hose to carry off the wash water.

It is understood that this disclosure is illustrative and that the invention embraces any equivalents or modifications within the scope of the appended claims.

What is claimed is:

1. A beverage dispenser comprising: a storage tank; a substantially cylindrical refrigerating element mounted vertically in said tank; a restricted chamber surrounding the lower part of said element and communicating with said tank, said chamber having a wall provided with an orifice; a pipe leading into said chamber forming a nozzle adapted to discharge substantially tangentially to said element, and a pump connected so as to draw beverage out through said orifice and discharge beverage through said nozzle.

2. A beverage dispenser comprising: a cylindrical tank reduced in diameter at its lower end to form a neck; a cylindrical refrigerating element of smaller diameter than said neck mounted coaxially in said tank; a cap connecting said neck to said element; an orifice in said cap; a pipe extending through said cap and forming a discharge nozzle adapted to discharge substantially tangentially to said element; and a pump connected so as to draw beverage out through said orifice and discharge it through said nozzle.

3. A beverage dispenser according to claim 2, having a dispensing valve to which said pipe is connected, and a second pipe communicating with said first-named pipe in the vicinity of said valve and leading to said orifice.

4. A beverage dispenser comprising: a cabinet, a horizontal wall separating said cabinet into upper and lower compartments and having a well in one corner; a tank supported on said wall, a cylindrical refrigerating element mounted centrally on said wall and extending vertically into said tank; a restricted chamber surrounding the lower part of said element and communicating with said tank, said chamber having a wall provided with an orifice; a pipe extending into said chamber and forming a nozzle adapted to discharge substantially tangentially to said element; and a pump mounted in said well outside said chamber and connected so as to circulate beverage out through said orifice to a valve and back through said nozzle.

5. A beverage dispenser comprising: a storage tank; a cylindrical wall forming a chamber in communication with the lower part of said tank; a dispensing valve; an orifice in said wall; a pipe leading through said wall and terminating in a nozzle adapted to discharge substantially tangentially to said wall; piping connections from said orifice to said valve and from said valve to said nozzle; and a pump connected so as to circulate beverage out through said orifice to said valve and back through said nozzle.

6. A beverage dispenser comprising: a storage tank; a substantially cylindrical refrigerating element mounted vertically in said tank; an outlet in the lower part of said tank; a discharge port adapted to discharge into said tank substantially tangentially to said element; and a pump connected so as to draw beverage out through said outlet and discharge it back into the tank through said port.

7. A beverage dispenser comprising: a storage tank; a substantially cylindically refrigerating element mounted vertically in said tank; an outlet opening in the lower part of said tank; a pump connected to said outlet so as to draw beverage therefrom; a dispensing valve; a discharge means adapted to discharge into said tank substantially tangentially to said element; and a first piping connection from the discharge side of said pump to said valve, and a second piping connection from said valve to said discharge means, whereby beverage drawn from said outlet is circulated by said pump past said valve and discharged back into the tank through said discharge means thus setting up a rotary flow of beverage around said element.

8. A beverage dispenser comprising: a storage tank; a refrigerating element mounted in said tank; a curved wall surrounding, and spaced from, the lower part of said element; an outlet orifice in said wall; a pump having an intake port and a discharge port; a piping connection from said outlet orifice to said intake port; a dispensing valve having a housing defining a chamber, a dispensing orifice in said housing communicating with said chamber, and a plunger adapted to cover said dispensing orifice; a first pipe connecting said discharge port to said valve and leading into said chamber to one side of said plunger; a second pipe connected to said valve and leading into said chamber to the other side of said plunger, said second pipe running from said valve to a point inside said wall and having a discharge opening substantially perpendicular to said wall.

References Cited in the file of this patent

UNITED STATES PATENTS

| | | |
|---|---|---|
| 1,859,566 | Konikow | May 24, 1932 |
| 2,328,110 | Thompson et al. | Aug. 31, 1943 |
| 2,440,406 | Kerr | Apr. 27, 1948 |